United States Patent [19]

Müller et al.

[11] 4,288,090
[45] Sep. 8, 1981

[54] ELASTIC LATERAL SUPPORT WITH SUPPORTING WHEEL FOR CHILDREN'S BICYCLES

[76] Inventors: Franz Müller, Eichelhäherstrasse 1, 6200 Wiesbaden; Helmut Müller, Brunnenstrasse 63, 6231 Liederbach, both of Fed. Rep. of Germany

[21] Appl. No.: 94,678

[22] Filed: Nov. 15, 1979

[30] Foreign Application Priority Data

Nov. 22, 1978 [DE] Fed. Rep. of Germany ....... 2850568

[51] Int. Cl.³ .................... B62H 1/12; B62H 7/00
[52] U.S. Cl. .................................................. 280/293
[58] Field of Search ............ 280/293, 295, 296, 298, 280/301, 289 R, 289 G

[56] References Cited

U.S. PATENT DOCUMENTS

| | | | |
|---|---|---|---|
| 2,391,982 | 1/1946 | Kutil | 280/293 |
| 2,450,979 | 10/1948 | Moller | 280/293 |
| 2,530,498 | 11/1950 | Atwood et al. | 280/293 |
| 2,793,877 | 5/1957 | Meier, Jr. | 280/293 |
| 3,401,954 | 9/1968 | Brilando | 280/293 |
| 3,486,766 | 12/1969 | Persons | 280/289 G |
| 3,642,305 | 2/1972 | Pawsat | 280/293 |

FOREIGN PATENT DOCUMENTS 2276209 1/1976 France ................ 280/293

Primary Examiner—Joseph F. Peters, Jr.
Assistant Examiner—Donn McGiehan
Attorney, Agent, or Firm—Larson and Taylor

[57] ABSTRACT

An elastic lateral support with supporting wheel for children's bicycles comprising a single resilient part releasably attachable at one end to the frame of the bicycle and containing a supporting wheel at the other end, said lateral support in the mounted state at a tilting moment of 15 Nm exhibiting an elastic deflection of at least 20 mm, preferably at least 40 mm. The lateral support is attached to the frame of the bicycle with releasable clamping support composed of a inside clamping holder and an outside clamping holder bolted together at one end by the wheel nut and on the other end by a clamp bolt.

12 Claims, 4 Drawing Figures

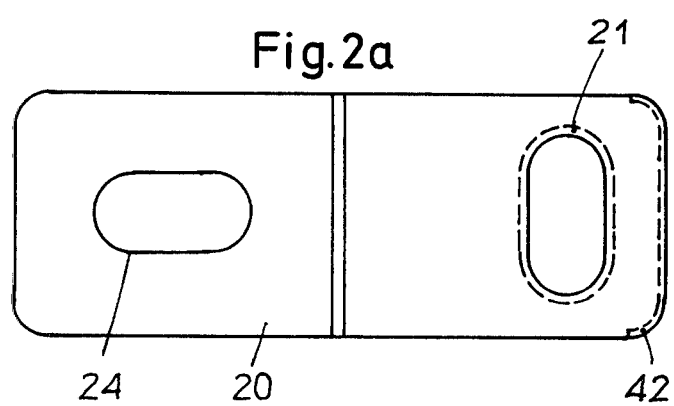
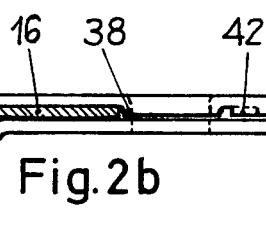
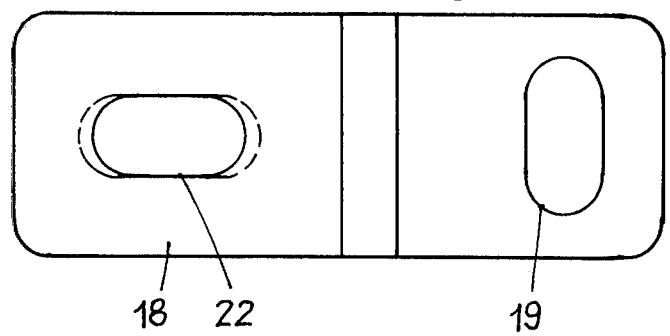

ELASTIC LATERAL SUPPORT WITH SUPPORTING WHEEL FOR CHILDREN'S BICYCLES

BACKGROUND OF THE INVENTION

1. Field of the Invention

The invention relates to an elastic lateral support with supporting wheel for children's bicycles.

2. Description of the Prior Art

With the attachment of lateral supporting wheels to children's bicycles, the children who cannot yet bicycle are given the opportunity to get used to the position of the body and to the movement while riding a bicycle. Customarily, however, the lateral supports are rigid. In that case it is overlooked that rigid lateral supports are not suitable either as an auxiliary means to teaching, not as a safety device for preventing dangerous falls. In this respect a bicycle equipped with two lateral supporting wheels is even inferior to a tricycle since the latter, while running over bumpy spots offers greater stability and does not suffer from the disadvantage that while passing over hollows and holes of the driving wheels suddenly spinning freely a distance from the ground. If the running plane of the supporting wheels is adjusted higher than that of the main wheels then the bicycle will travel now to the right and now to the left at an inclination and will always run on three wheels with a dangerously narrow wheel base. As a result the child rocks back and forth and assumes a very unhappy, laterally bent-over sitting position. Finally, the only advantage of rigid lateral supports as compared to a tricycle consists in that they can be removed whenever one tires of this emergency solution.

Elastic lateral supports in numerous embodiments are already known. Usually in that case a swivellably mounted arm has been known which carries a lateral supporting wheel combined with a helical or leaf spring, supported on the frame of the bicycle, which loads the arm in such a way that the supporting wheel is resiliently pressed against the ground, (see for example, German OS No. 2 064 412, U.S. Pat. Nos. 2,391,982 and 2,450,979). All such constructions suffer from the disadvantage that they are expensive and subject to breakdowns because of the large number of relatively complicated parts and because of the necessity of having joints. For this reason they have not prevailed hitherto in practice.

Embodiments of elastic lateral supports are also known where the spring itself carries the supporting wheels instead of an articulately mounted arm (see U.S. Pat. No. 2,793,877 and British Pat. No. 2432 A.D. 1896). It is true, however, that in the case of these constructions a simplification of the supports has not been realized fully, because the springs are always firmly connected with several other parts which carry the supporting wheel or which are used for attachment to the bicycle frame or which form a complex system of springs. The known combined carrying and spring members are therefore relatively heavy, complicated in construction and expensive.

SUMMARY OF THE INVENTION

An object of the invention is to create an elastic lateral support of the aforementioned type which is considerably simpler and lighter than the embodiments known hitherto. This is achieved, according to the invention by an elastic support comprising a single resilient part in one piece, which may be attached releasably to the bicycle frame on the one end, and on the other end, carries the axle of the supporting wheel itself. The lateral support exhibits an elastic deflection in the mounted state and at a tilting moment of 15 Nm of at least 20 mm, preferably at least about 40 to 60 mm.

Naturally, the known, rigid lateral supports are also "elastic" in the physical sense of the word. In regard to the practical use and with due consideration of the forces or tilting moments, depending essentially on the weight of the children and occurring thereby, they behave "practically rigidly". Therefore, in case of a moment of, for example, 15 Nm, acting upwards and transversely to the direction of travel, they will yield only less than 10 mm and in case of deflections of, for example, 30 to 50 mm, they already are deformed plastically or break off.

The new lateral support of the invention differs from the customary rigid embodiments by the fact that its elastic characteristics and its extended spring-path during its practical use according to its function appear effectively and may be felt clearly. The child is supported evenly from the first moment he or she mounts the bicycle. The first riding exercises are done in a straight sitting position, whereby swinging from one supporting wheel onto the other is avoided and the hind wheel at the same time loses contact with the ground from time to time. Elevation and pot holes over which the hind wheel rolls are balanced out resiliently by the supporting wheels. It is the same with stones and branches, over which one of the supporting wheels rolls. The elastic support introduces, despite the security it offers, a genuine two-wheel effect. This has a favorable effect, especially when riding around curves and for the entire learning process. Also the change-over of riding without supporting wheels takes place with greater ease. Quite continuously, the reversing force of the elastic lateral supports, which increases with increasing deflection, is used ever more rarely in order to remain in the erect equilibrium position and to delay lateral falling movements so that the child may support itself with its foot on the ground. Possibly and additionally, an adjustable construction may be selected, for example, by changing the length of the bracket or the level of the running surface of the supporting wheels with reference to that of the hind wheel in case of a relaxed spring, so as to continuously reduce the spring force of the lateral supports and have it correspond to the learning progress. Consequently, the dangerous periods are omitted in cases where the child hitherto had been exposed to the increased danger of an accident.

A particularly advantageous effect of the elastic lateral supports in the form of arms projecting out laterally for about 10-15 cm and attached on the frame of the bicycle near the rear axle, with always one supporting wheel mounted at the free end, is the fact that a deflection upwards is associated with an enlargement of the distance between the lowest point of the rear wheel and of the supporting wheel. During travel, there results from the change of distance between the rear wheel and one supporting wheel no essential influencing of the stiffness of the lateral support, since the wheels to the degree in question may run apart without any trouble. While standing, however, on normally skid resistant ground, the friction of the wheels in skidding in a transverse direction is so great that this does not occur at all, i.e., the lateral support will be prevented from yielding and therefore almost acts like a rigid support while standing.

For the invention it is essential that the lateral support consists of a single resilient part, the inside end of which may be attached to the bicycle frame by means of a suitable support, and the outside end of which is prepared as a result of the arrangement of a hole or of a peg developed in one piece with the spring for easy mounting on a commercial supporting wheel. Several shapes come to mind for the supporting part. For a flat, ribbon-shaped starting material, L-, U- or S-shaped forms are suitable, whereby the outside end always extends essentially in parallel to the supporting wheel mounted thereon. At the same time, it will be possible to put the axle of the supporting wheel through a hole in the spring and to attach it thereon. Alternatively, as a starting material for the resilient part, also a round material comes to mind, which beside the already mentioned shapes, may also be bent or wound into a cylindrical or conical coil spring. In connection with relatively large supporting wheels, even straight spring bars come to mind. The latter may also extend rearwardly along the frame with reference to the place of attachment, so that in the case of a normal load, they will not experience any bending stress or torsional stress.

In a preferred practical embodiment, the elastic lateral supports are so yielding that they may be completely "bent over". Therefore, they are not damaged whenever the bicycle falls or is thrown onto its side. Such an embodiment will avoid damage to the lateral supports which otherwise would be feared and expected whenever a bicycle is forcefully put on its side when children are playing. It also avoids the impacts that increase constructional expenditures and the danger of injury by crushing.

The innovation is not restricted to one certain characteristic line of a spring. Although, numerical values of individual points of the characteristic line of a spring has been presented above by way of example, this does not mean that the same ratio pertains for all pairs of tilting moments and deflection assigned to each other. For example, instead of a linear support, a progressively acting resilient support may be used in the case where the return force increases overproportionally in relation to the deflection.

It will be effective to arrange the lateral supports in such a way that the supporting wheels are forced on a flat plane with pretension against the ground. Depending on the geometry of the lateral support, one will normally allow its free end, which carries the supporting wheel, to point inwardly in the direction of the rear wheel in the relaxed state, so that in the relaxed state the supporting wheel is in camber, and in a normally pretensed state during travel on a flat plane, it stands approximately perpendicularly.

It has been known to attach the lateral supports beside the rear wheel axis to the frame of the bicycle in a non-positive or positive manner. For this purpose, suitable supports may be used which preferably are developed such that they will prevent a swivelling of the lateral supports forward or backward. In view of the strong elastic deformations of the new lateral support, it will be of advantage whenever the parts, subjected to deformation, are not weakened at the place of attachment by holes, slits or similar things. In order to be able to adjust the pretension to any desired value, a clamping support has been attached which permits the clamping of an arm carrying the support wheel in any arbitrary position. At the same time the safety mechanism against twisting may be created in such a way that is will engage with projections into an otherwise customary elongated slit of the frame receiving the axle of the rear wheel.

BRIEF DESCRIPTION OF THE DRAWINGS

The invention will be explained in more detail subsequently on the basis of the drawings.

FIG. 2a and FIG. 2b are lateral views of the two clamping holders of the lateral support shown in FIG. 1.

FIG. 2c is a top view of the clamping holders of FIG. 2 in clamped position.

DETAILED DESCRIPTION OF THE INVENTION

Figure 1:
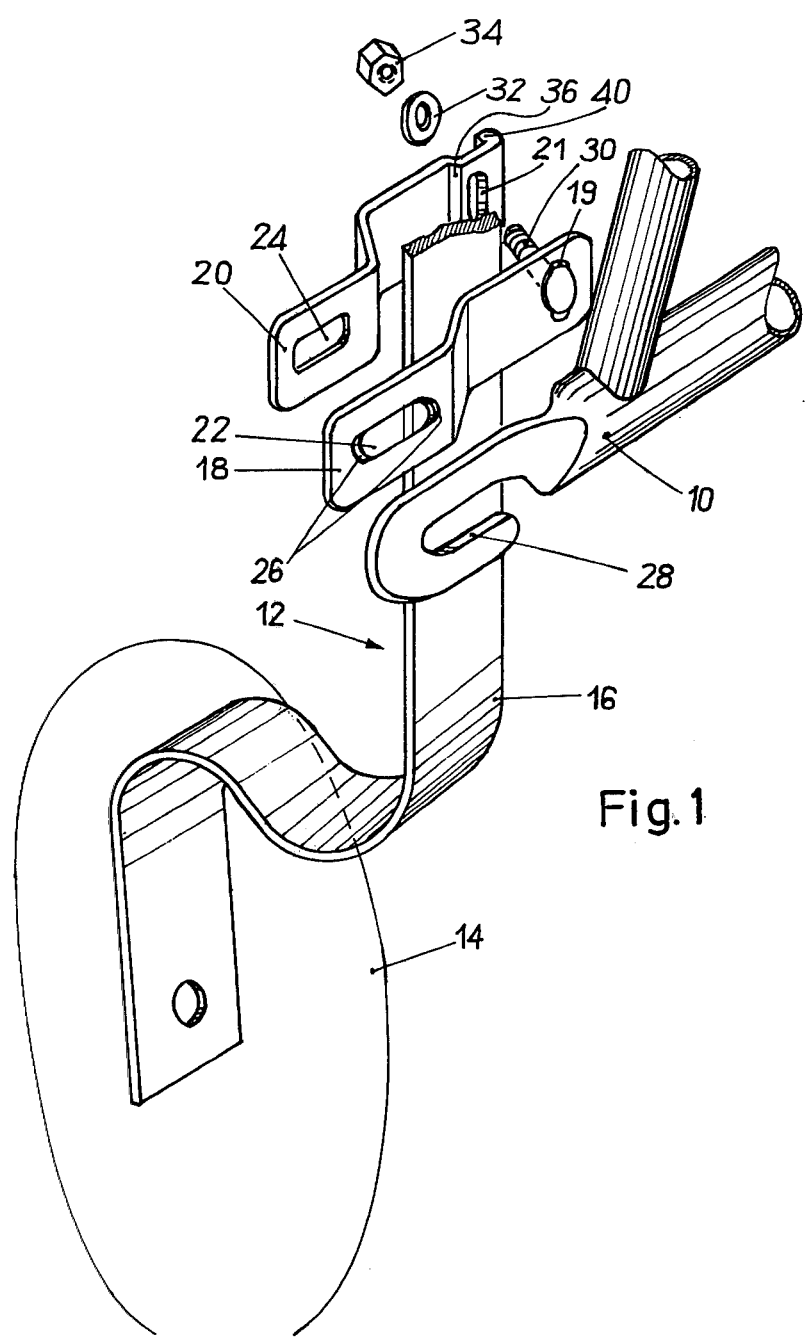
FIG. 1 shows a perspective presentation of an elastic lateral support according to the invention and of its mounting.

FIG. 1 shows the end of the fork 10 of the rear wheel of a bicycle and beside it an elastic adjustable lateral support designated 12 with a supporting wheel 14. The lateral support 12 consists of an arm 16, an inside clamping holder 18 and an outside clamp holder 20. The two clamp holders, 18, 20 have elongated holes 22 and 24, respectively and with these they are put onto the end of the rear wheel axle, not shown, projecting outward beyond the fork 10 of the rear wheel, and is attached by nuts holding the rear wheel on the frame of the bicycle. At the same time, two projections 26 engage at the edge of the elongated hole 22 in the inside clamp holder 18 with the customary longitudinal slit 28 at the end of the fork of the rear wheel which accommodates the rear wheel axle. In this way, the inside clamp holder 18 is secured against rotation. The rotation of the outside clamp holder 20 and arm 16 with reference to the inside clamp holder 18 is prevented by joining perpendicular edges or transverse or slanting surfaces. The elongated holder 22 and 24 do not disturb the adjustment of the rear wheel axle in the longitudinal slit 28.

The clamping of the straight upper part of the arm 16 guided between adjoining clamp holders 18 and 20 in a vertical position is accomplished by means of a clamping screw 30, a washer 32 and an outside cover nut 34 pulling the front ends of the two clamp holders toward each other. The clamping screw is seated in corresponding holes in the clamp holders. By selecting the upper straight end of arm 16 of sufficient length, the lateral support may always be produced in the same embodiment and size and may be attached to bicycles of variable sizes always with the desired pretension against the ground.

The embodiment shows an arm 16 which is produced from a flat material rectangular in cross section having a thickness of about 1.5 to 3 mm and a width of about 15 to 30 cm. The material may be a suitable spring steel which, in the manner shown in the middle area, is bent in the form of an S with radii of about 30 to 40 mm, so that the lower free end of the arm 16 which carries the supporting wheel 14 is laterally displaced in relation to the upper straight end of the arm 16 by about 10 to 15 cm. The lateral support therefore projects by about as much in relation to the rear wheel fork 10 The elasticity of the arm 16 may be selected such that a force of, for example, 100 N directed upwards and acting upon the supporting wheel 14 results in a deflection in the order of magnitude of 30 to 70 mm. The arm 16 should not be damaged either, whenever it is further bent upwards in the same direction, as happens whenever the bicycle, counter to the force of the spring, is placed on its side.

In order that the clamping screw 30 and the pertinent nut 34 may exercise a clamping force on the arm 16 in the desired manner and be seated straight at the same time, provision is made as shown in FIG. 1 for a lip or projection wherein the outside screw part, in this case the nut 34 abuts against step-shaped reduction 36 on one side of its circumference, and on the other side of its circumference is supported by a projection 40 on the outside clamp holder 20. As the embodiment according to FIG. 2 shows, it would be possible to provide an inside lip or projection 42 or something similar instead of the outside lip or projection 40.

In the embodiment of FIG. 1, the arm 16 is secured against twisting in the clamping support 18, 20 through the fact that it abuts against a step-shaped reduction 36 of the outside clamp holder 20. Alternatively, it would be possible according to FIG. 2a, 2b to replace the step-shaped reduction 36 with an inside lip or projection 38 adjacent the elongated hole 21 in the outside clamp holder 20 through which the clamping screw 30 extends. Correspondingly, however, it would also be possible to guard against twisting of the arm 16 by providing the edge of the oblong hole 19 in the clamp holder 18, with the projectons or lips.

In the proposed form and in connection with a suitable clamping support, for example, according to FIG. 1 or FIG. 2, the elastic lateral support has the considerable advantage that it may be adjusted individually depending on the size of the bicycle and the desired pretention in its length or its height, whereby then merely the upper end of the arm 16 will project more or less far beyond the clamping support 18, 20 . Another considerable advantage consists in the fact that independently of the length of the resilient arm between the mounting place of the supporting wheel and the clamping place in the clamping support, the arm always is available in its entire length for the purpose of elasticity. This results in an optimal spring length which has a favorable effect on the elastic properties of the new lateral support.

We claim:

1. An elastic lateral support with supporting wheel for children's bicycles comprising a single resilient part releasably attachable at one end to the frame of the bicycle and having said supporting wheel at the other end, said lateral support in the mounted state at a tilting moment of 15 Nm exhibiting an elastic deflection of at least 20 mm and being deflectable up to the contact of the resilient part or of the supporting wheel on the frame.

2. The lateral support of claim 1, wherein the deflection, at a tilting moment of 15 Nm is at least 40 mm.

3. The lateral support of claim 2, the deflection at a tilting moment of 15 Nm is at least 60 mm.

4. The lateral support of claim 1 characterized in that the resilient part is an arm comprised of a rectangular spring-steel flat material.

5. The lateral support as in claim 4 wherein the arm is about 1.5 to 3 mm thick and about 15 to 30 mm wide and its lateral displacement relative to the upper end of the arm amounts to about 10 to 15 cm.

6. The lateral support as in claim 4, wherein the arm is essentially curved in a S-shape.

7. The lateral support as in claim 6 wherein the curvatures have a radius of about 20 to 40 mm.

8. The lateral support of claim 4 wherein the arm is attached to the frame of the bicycle at the upper end with a releasable clamping support.

9. The lateral support of claim 8, wherein the clamping support consists of an inside clamping holder and an outside clamping holder bolted together at one end by the wheel nut and on the other end by a clamp bolt and nut while clamping down the resilient part and whereby the position of the upper end of the resilient part is secured between the clamping holders by edges or projections provided thereon.

10. The lateral support of claim 9, wherein the clamping holders are provided with cooperating elongated holes through which said holders are bolted.

11. The lateral support of claim 9, wherein the edge or projection securing the position of the upper end of the resilient part comprises a raised edge of an oblong hole in one of said clamping holders.

12. The lateral support of claim 11, wherein that the clamp bolt or its nut covers up the resilient part on one side of its circumference and is supported on the other side by a projection on one of the clamping holders.

* * * * *